United States Patent [19]
Yun

[11] Patent Number: 6,014,229
[45] Date of Patent: Jan. 11, 2000

[54] DOCUMENT SIZE DETECTION DEVICE FOR AN IMAGE RECORDING AND FORMING APPARATUS

[75] Inventor: Young-Jung Yun, Kyungki-do, Rep. of Korea

[73] Assignee: SamSung Electronics Co., Ltd., Kyungki-do, Rep. of Korea

[21] Appl. No.: 09/022,028

[22] Filed: Feb. 11, 1998

[30] Foreign Application Priority Data

Feb. 13, 1997 [KR] Rep. of Korea ................ 97-4194

[51] Int. Cl.[7] .............. H04N 1/40; H04N 1/04; B65H 1/00
[52] U.S. Cl. ............... 358/449; 358/488; 358/498; 271/171
[58] Field of Search ................ 358/488, 449, 358/498, 401; 271/171; 399/370, 376, 377, 405

[56] References Cited

U.S. PATENT DOCUMENTS

| | | | |
|---|---|---|---|
| 4,506,302 | 3/1985 | Kurata | 358/449 |
| 4,626,924 | 12/1986 | Watanabe | 358/449 |
| 4,630,127 | 12/1986 | Fuwa | 358/449 |
| 4,698,511 | 10/1987 | Sueda et al. | 358/449 |
| 4,874,160 | 10/1989 | Yamamoto | 271/171 |
| 4,884,097 | 11/1989 | Giannetti et al. | 355/23 |
| 4,899,227 | 2/1990 | Yamada | 358/449 |
| 4,908,673 | 3/1990 | Muramatsu | 271/171 |
| 4,920,384 | 4/1990 | Okamoto | 399/370 |
| 5,199,695 | 4/1993 | Nakahata et al. | 271/171 |
| 5,215,303 | 6/1993 | Yamada et al. | 271/171 |
| 5,332,208 | 7/1994 | Tsuji et al. | 271/171 |
| 5,379,095 | 1/1995 | Oishi | 358/497 |
| 5,493,417 | 2/1996 | Morikawa et al. | 358/449 |
| 5,510,909 | 4/1996 | Morikawa et al. | 358/498 |
| 5,598,279 | 1/1997 | Ishii et al. | 358/402 |
| 5,606,430 | 2/1997 | Morikawa et al. | 358/498 |
| 5,611,528 | 3/1997 | Nakamura et al. | 271/171 |
| 5,681,036 | 10/1997 | Wakahara et al. | 271/171 |
| 5,687,010 | 11/1997 | Tilborg et al. | 358/488 |
| 5,689,759 | 11/1997 | Isemura et al. | 271/171 |
| 5,713,570 | 2/1998 | Ouchi | 271/171 |
| 5,805,308 | 9/1998 | Tanaka et al. | 358/488 |
| 5,826,156 | 10/1998 | Natsume et al. | 271/171 |
| 5,836,582 | 11/1998 | Ogawa et al. | 271/171 |
| 5,847,838 | 12/1998 | Takashimizu | 358/401 |
| 5,857,671 | 1/1999 | Kato et al. | 271/171 |

Primary Examiner—Cheukfan Lee
Attorney, Agent, or Firm—Robert E. Bushnell, Esq.

[57] ABSTRACT

A document size detection device for a facsimile device that improves the accurately of original document width detection. This reduces the errors generated by using an excessive amount of reduction on received facsimile images. The device uses a rotary document width sensor to increase the degree of accuracy with which the width of a document can be sensed. This also reduces the magnitude of excessive reduction that occurs when a document is improperly loaded and causes a width to be detected that is slightly larger than the actual width.

20 Claims, 7 Drawing Sheets

DOCUMENT SIZE DETECTION DEVICE FOR AN IMAGE RECORDING AND FORMING APPARATUS

CLAIM OF PRIORITY

This application makes reference to, incorporates the same herein, and claims all rights accruing thereto under 35 U.S.C. §119 through my patent application entitled *Document Size Detection Device for a Facsimile* earlier filed in the Korean Industrial Property Office on Feb. 13, 1997 and there duly assigned Serial No. 1997/4194.

BACKGROUND OF THE INVENTION

1. Field of the Invention

The present invention relates to a versatile office machine that uses a sheet feeder and, more specifically, to a device used by a facsimile device for accurately detecting the paper size of an original document.

2. Background Art

Office equipment that handles and copies documents, such as an electrophotographic apparatus or an image recording and forming device, must often determine the proper magnification of an original document to form a copy on a sheet of paper of a given size. In order to complete this process a versatile office machine must be able to determine the size of the original document. A document size detection device may include document guides, a guide gear, and document sensors for detecting the width of the original document. Such a document size detection device can detect four different document sizes.

In a facsimile device, however, the width of a recording sheet is specified at 216 mm (letter size) or 210 mm (A4 size). Thus, when a facsimile message is received that was created using an original document that was larger than the recording sheets used by the facsimile device, the facsimile device down scales the received facsimile message, or original image, to the specified size of the available recording sheets. The levels of magnification are shown in the following tables 1 and 2. Then the facsimile message is magnified to fit a recording sheet and the facsimile device forms the image onto a sheet of paper.

Many techniques that have been developed to determine the size of an original document are shown, for example, in U.S. Pat. No. 4,626,924 to Watanabe entitled *Image Forming Apparatus,* U.S. Pat. No. 4,698,511 to Sueda entitled *Document Sheet Size or Position Recognition Device,* U.S. Pat. No. 4,506,302 to Kurata entitled *Cut Sheet Facsimile,* U.S. Pat. No. 4,630,127 to Fuwa entitled *Character and Picture Information Reading Apparatus,* and U.S. Pat. No. 4,899,227 to Yamada entitled *Image Processing Apparatus Detecting the Size or Position of an Information Portion of an Original.* I believe it is possible to improve on the contemporary art by providing a document size detection device that avoids errors caused by excessive image size reduction, can classify the width of documents into a greater number of categories thus refining the accuracy of document width size detection, that avoids the loss of data due to using an improper reduction factor, that allows for a more precise degree of reduction to be used, and is economical to construct.

SUMMARY OF THE INVENTION

Accordingly, it is an object of the present invention to provide a device that accurately detects the paper size of an original document loaded into a facsimile device.

It is another object to provide a paper size detection device that prevents the excessive reduction of an original image due to an improper magnification adjustment It is still another object to provide a paper size detection device that prevents data loss caused by the improper scaling of an original image due to using an improper magnification adjustment.

To achieve these and other objects, a document size detection device may be constructed using two opposed document guides that each have saw-teeth along a side facing the opposing document guide, a guide gear interposed between the two document guides to symmetrically move the two document guides along the width dimension of a document, a sensor driving gear engaged with the guide gear, and a document size sensor having a rotary knob coaxially coupled to the sensor driving gear to generate a document size signal output according to the rotation of said sensor driving gear.

A document size detection device using two opposed document guides has saw-teeth on both sides of the first document guide and on one side of the second document guide. The guide gear that is interposed between the first and second document guides engages both guides to symmetrically move the first and second document guides in the direction of a document's width. A sensor driving gear is engaged with the first document guide and a document size sensor that has a rotary knob is coaxially connected to the sensor driving gear. The document size sensor generates a document size signal output that depends on the rotation of said sensor driving gear. Here, the document size sensor is composed of a variable resistor.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
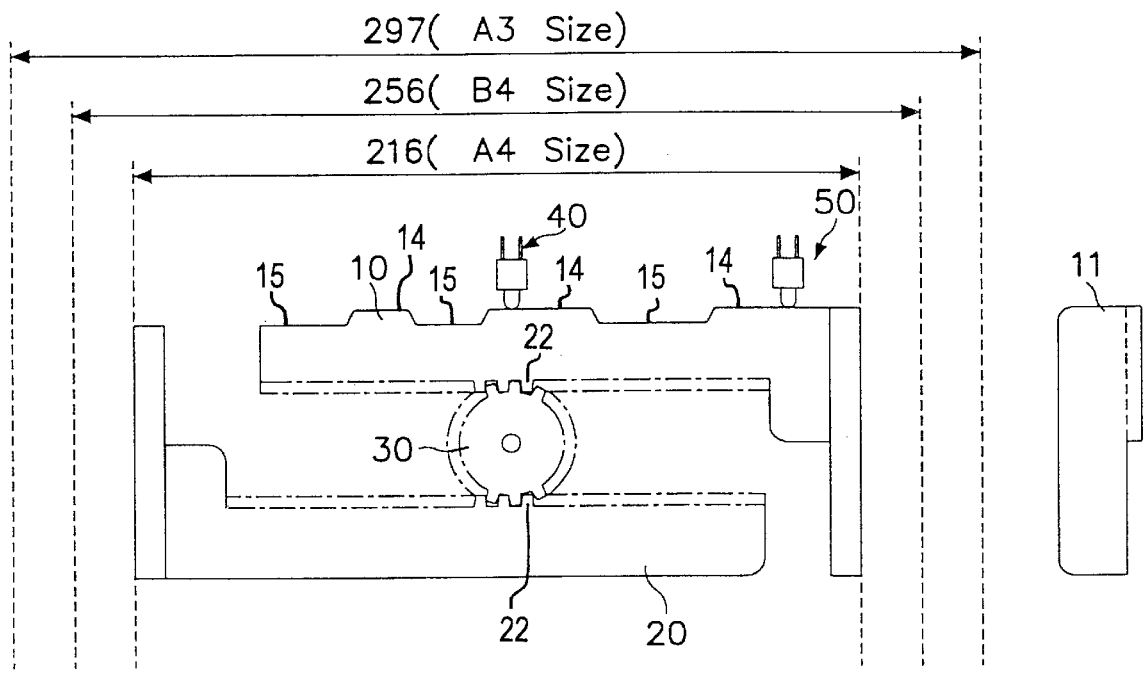
FIG. 1 is a diagram of a document size detection device that senses a document that has a size smaller than the A4 size.

Turning now to the drawings, FIGS. 1 through 4 illustrate a document size detection device that may be constructed using first and second document guides 10 and 20, guide gear 30, and first and second document size sensors 40 and 50. Guide gear 30 is interposed between first and second document guides 10 and 20 to force the document guides to move symmetrically along the width dimension of a sheet of paper. The document detection device can detect four different document sizes. As shown in FIG. 1, first and second document guides 10 and 20 each have saw-teeth 22 along one side that engage interposing guide gear 30. Reference numeral 11 denotes a side view either first or second document guides 10 and 20.

Figure 2:
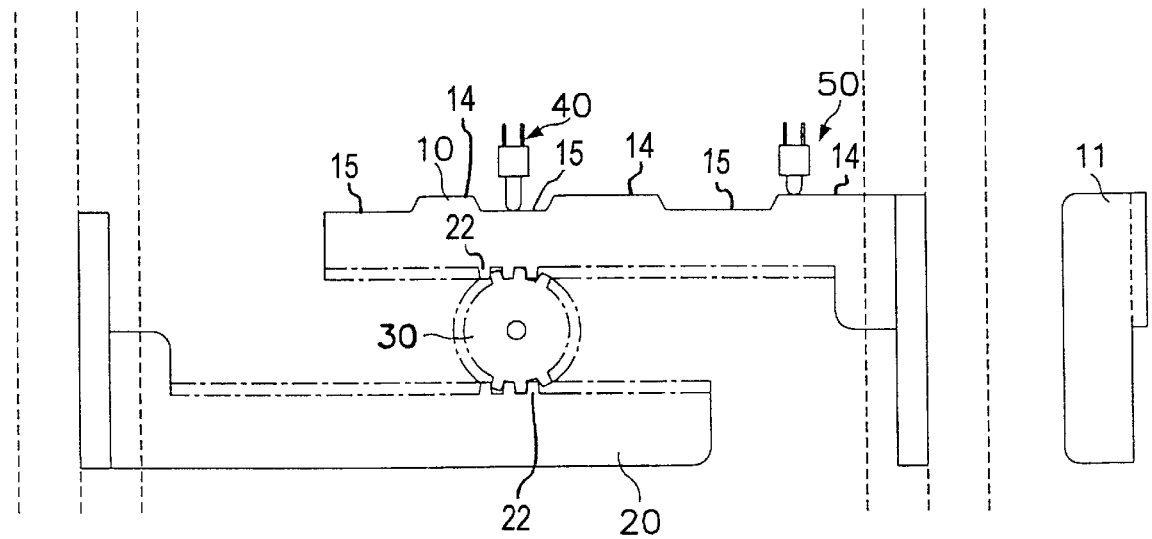
FIG. 2 is a diagram of a document size detection device that senses a document larger than the A4 size but smaller than the B4 size.
Figure 3:
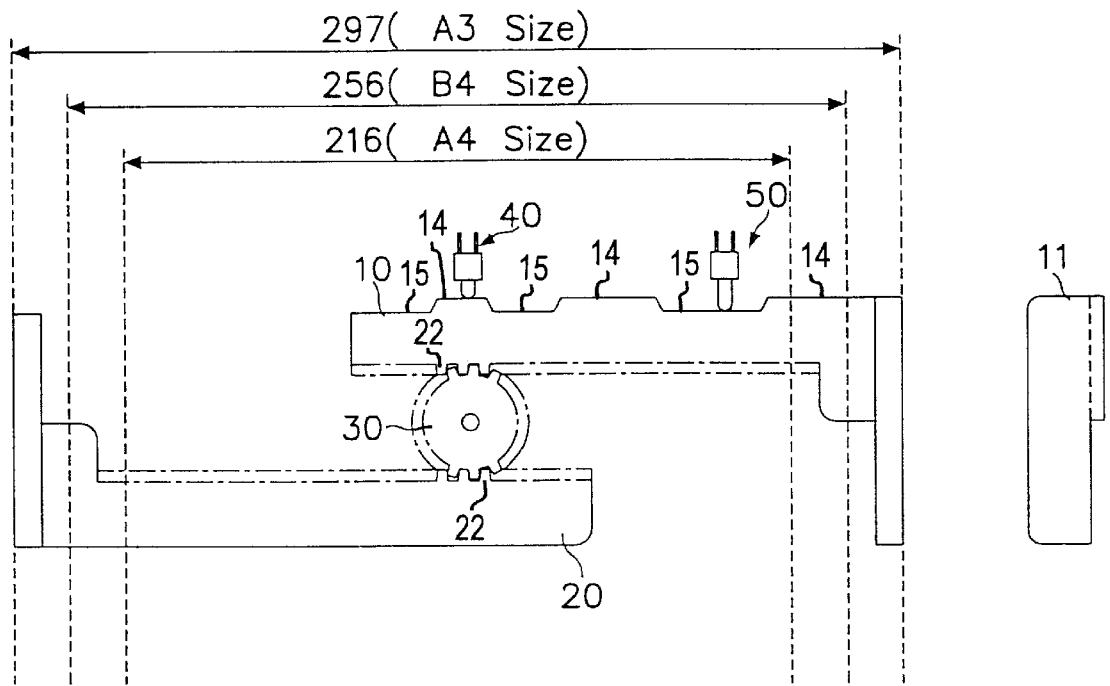
FIG. 3 is a diagram of a document size detection device that senses a document larger than the B4 size but smaller than the A3 size.
Figure 4:
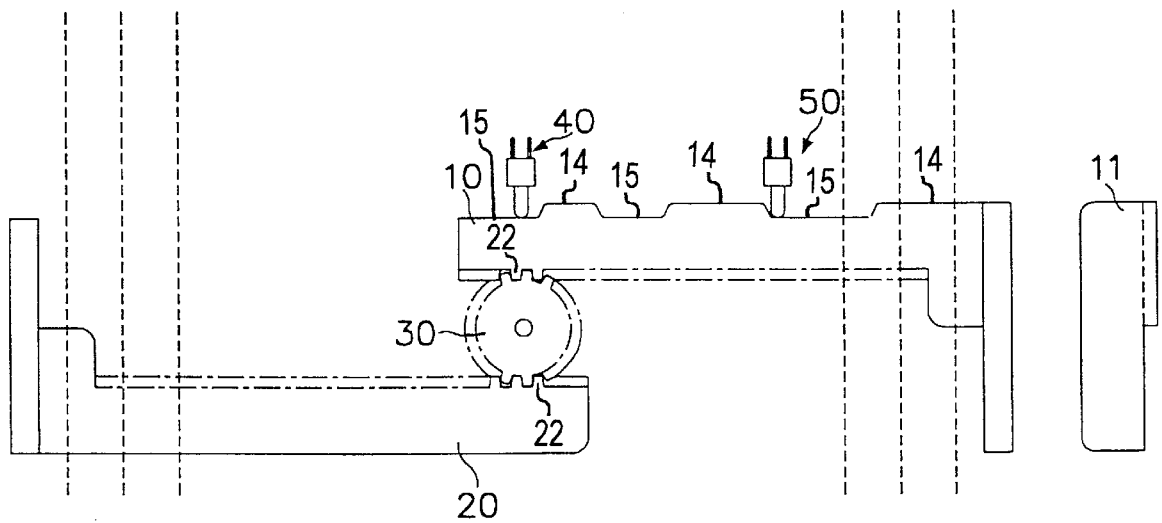
FIG. 4 is a diagram of a document size detection device that senses a document larger than the A3 size.

To print the received facsimile message onto the recording sheet, first and second sensors 40 and 50 are tuned on and off depending on the original document size. Depending on the alignment of first and second document guides 10 and 20, first and second sensor 40 and 50 are either in contact with normal surface 14 or recessed surface 15. When a sensor is in contact with one of normal surfaces 14 the sensor is in an off position. When a sensor is in contact with one of recessed surfaces 15, the sensor is in an on position. FIG. 1 shows the document guides in a position indicating the original document is smaller than the A4 size. FIG. 2 illustrates document guides 10 and 20 in a position that accommodates paper sized greater than the A4 size and less than the B4 size. Document guides 10 and 20 are shown in a position that accommodates paper sized between the B4 size and the A3 size in FIG. 3. FIG. 4 shows document guides 10 and 20 in a position that accommodates paper of greater size than the A3 size. Tables that correlate the sensor signals and the magnification needed to fit a facsimile image onto A4 paper with the size of the original document used to generate the facsimile message are shown below.

TABLE 1

Correlation between original document size, sensor signals, and magnification.

| Document Width | Scale | 1st Sensor | 2nd Sensor |
|---|---|---|---|
| Width < A4 | 100% | off | off |
| A4 ≦ Width < B4 | about 85% | on | off |
| B4 ≦ Width < A3 | about 73% | off | on |
| A3 ≦ Width | about 70% | on | on |

TABLE 2

Correlation between original document size, first sensor output, and magnification for A4 paper sized for a line printer.

| Document Width | Scale | 1st Sensor |
|---|---|---|
| Width < A4 + 26mm | 100% | off |
| A4 + 26mm ≦ Width | about 85% | on |

Table 1 details the situation where the original document is smaller than the A3 size, while table 2 details the situation where the original document is smaller than A4+26 mm, the actual size of the A4-sized paper used in line printers. If an original document that is slightly smaller or equal to the B4 size is loaded into the facsimile device through document guides 10 and 20 at a slant, such that images formed or recorded on the paper would be at an angle with respect to that of the original, the document size detection device may mis-recognize the document and treat the document as if it were larger than the A3 size. This would result in the facsimile device excessively down scaling the received facsimile message to a scale of 70% rather than using an 85% scale. This excessive reduction can result in the loss of clarity in the resultant image or even make the image illegible. Conversely, when a document slightly larger than the A3 size is loaded into the facsimile device through document guides 10 and 20 at a slant, the original image may not fitted onto one of the available sizes of recording sheets in the facsimile device. This results in a partial loss of the facsimile image and a corresponding loss of data.

Furthermore, as detailed in table 2, if the original document is larger than the A4 size but slightly smaller than A4+26 mm, the facsimile does not down scale the original image so that the original image may be cut out at both sides of the recording sheet. The reason that the document size is set to A4+26 mm is that A4-sized paper used with a line printer has punch holes of about 10 mm along both sides. Thus, if an original document that is slightly smaller than the A4+26 mm size is loaded into the facsimile device at an angle, the transmitting facsimile machine may falsely detect an original document size greater than the A4+26 mm, causing the receiving facsimile device using a line printer will unnecessarily reduce the size of the transmitted image. This can result in a lack of clarity in the reduced image or in the formed image being illegible.

A document size detecting device as constructed according to the principles of the present invention is shown in FIGS. 5 through 9. The first embodiment of a document size detection device as constructed according to the principles of the present invention may be constructed using two document guides 10 and 20, guide gear 30, sensor driving gear 101, sensor board 103, and document size sensor 102 that is mounted on sensor board 103. Each document guide has saw-teeth along a side to engage guide gear 30. Guide gear 30 is interposed between document guides 10 and 20 to force the guides to move symmetrically. Sensor board 103 is fixed to frame 60 and attached to document size sensor 102. Document size sensor 102 is composed of a variable resistor having rotary knob 301 coupled to central through hole 300 in sensor driving gear 101.

More specifically, guide gear 30 is interposed between the two document guides 10 and 20 and is engaged with document guides 10 and 20 to symmetrically move the document guides along the width dimension of an original document. Furthermore, guide gear 30 is engaged with sensor driving gear 101, that is located on the opposite side of the document guides from fastener 3a. Sensor driving gear 101 is coaxially coupled to knob 301 of variable resistor 102. Knob 301 rotates along with the rotation of sensor driving gear 101. It is possible to indirectly engage sensor driving gear 101 with guide gear 30 by using a plurality of gears, rather than having guide gear 30 and sensor driving gear 101 directly engage each other.

Figure 5:
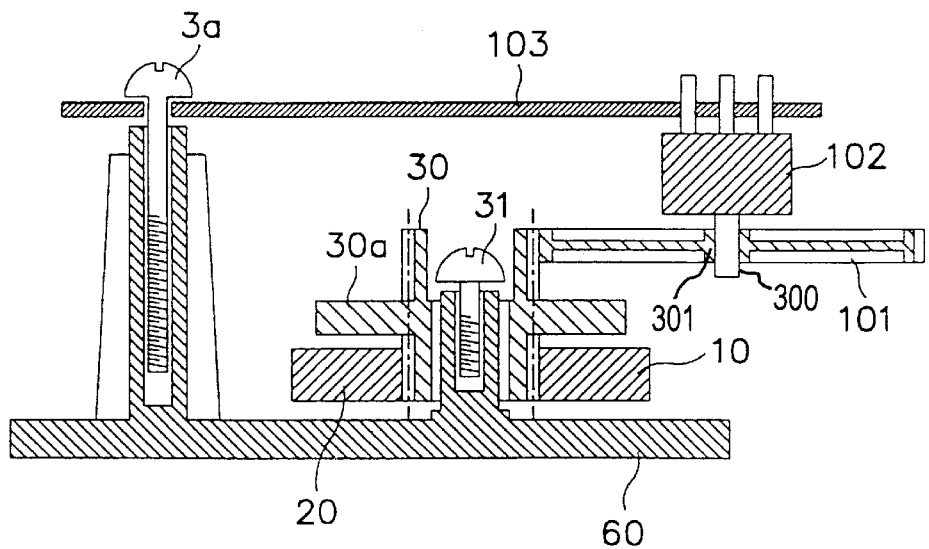
FIG. 5 is a cross-sectional view of a document size detection device as constructed according to the principles of the present invention.

Document size sensor 102 is welded to sensor board 103 and sensor board 103 is firmly fixed to frame 60 by fastener 3a. The fastener can be any one of a screw, rivet, solder connection, clip or bolt. As shown in FIG. 5, guide gear 30 has projection 30a formed along the middle portion to prevent vertical deviation of either of the two document guides 10 and 20. Guide gear 30 is firmly fixed to frame 60 by means of a fastener 31.

Figure 6:
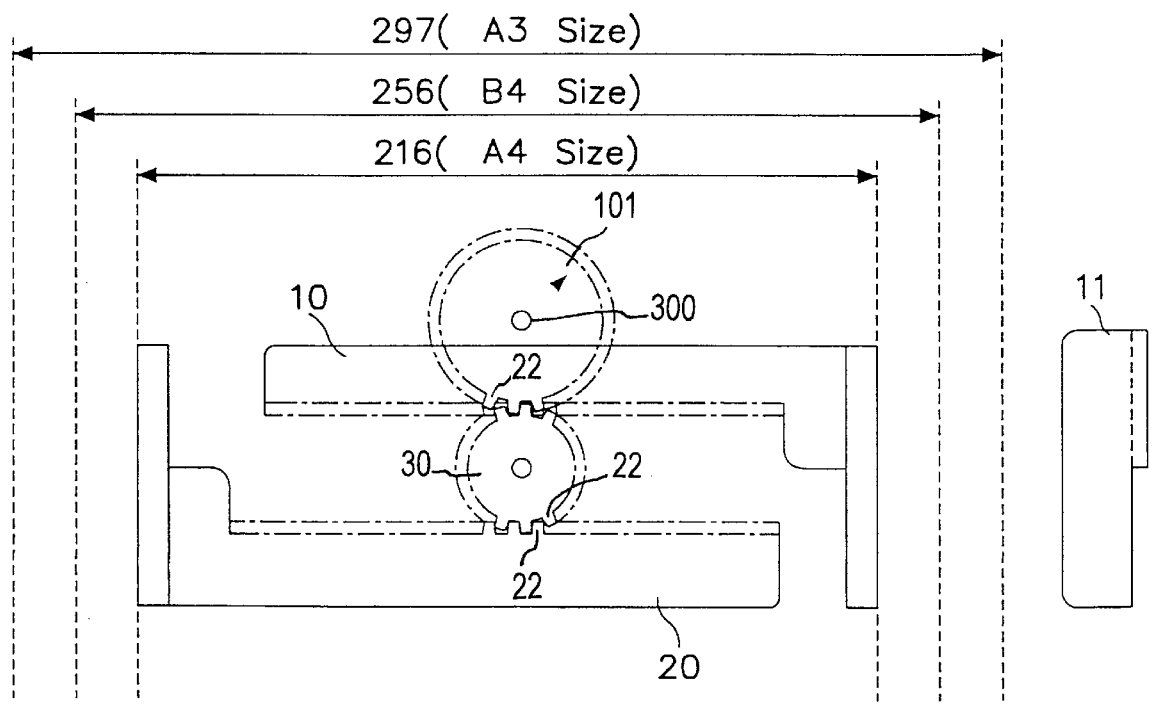
FIG. 6 is a front view of the document size detection device of FIG. 5 sensing a document smaller than the A4 size.
Figure 7:
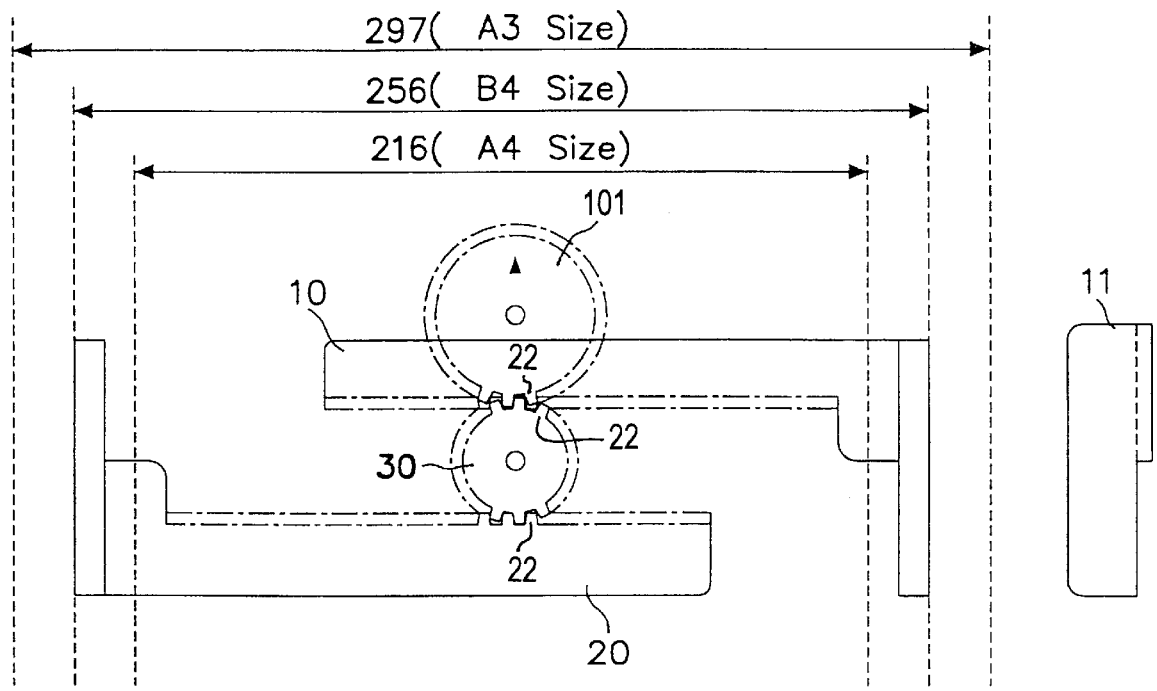
FIG. 7 is a front view of the document size detection device of FIG. 5 sensing a document larger than the A4 size but smaller than the B4 size.
Figure 8:
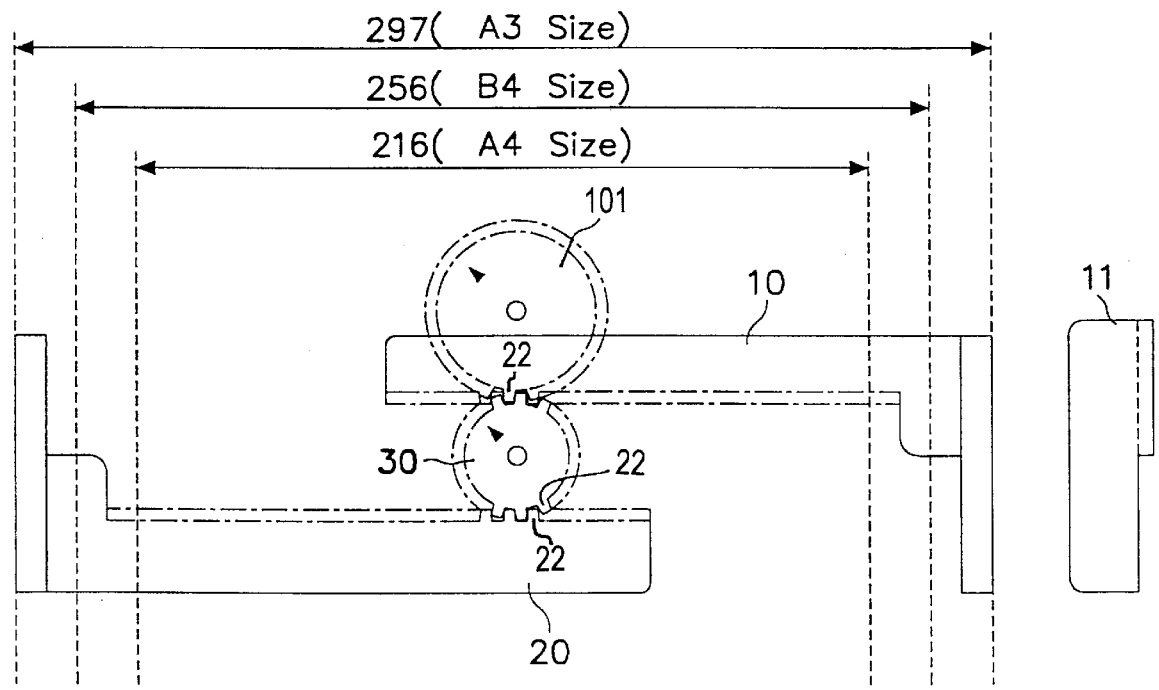
FIG. 8 is a front view of the document size detection device of FIG. 5 sensing a document larger than the B4 size but smaller than the A3 size.
Figure 9:
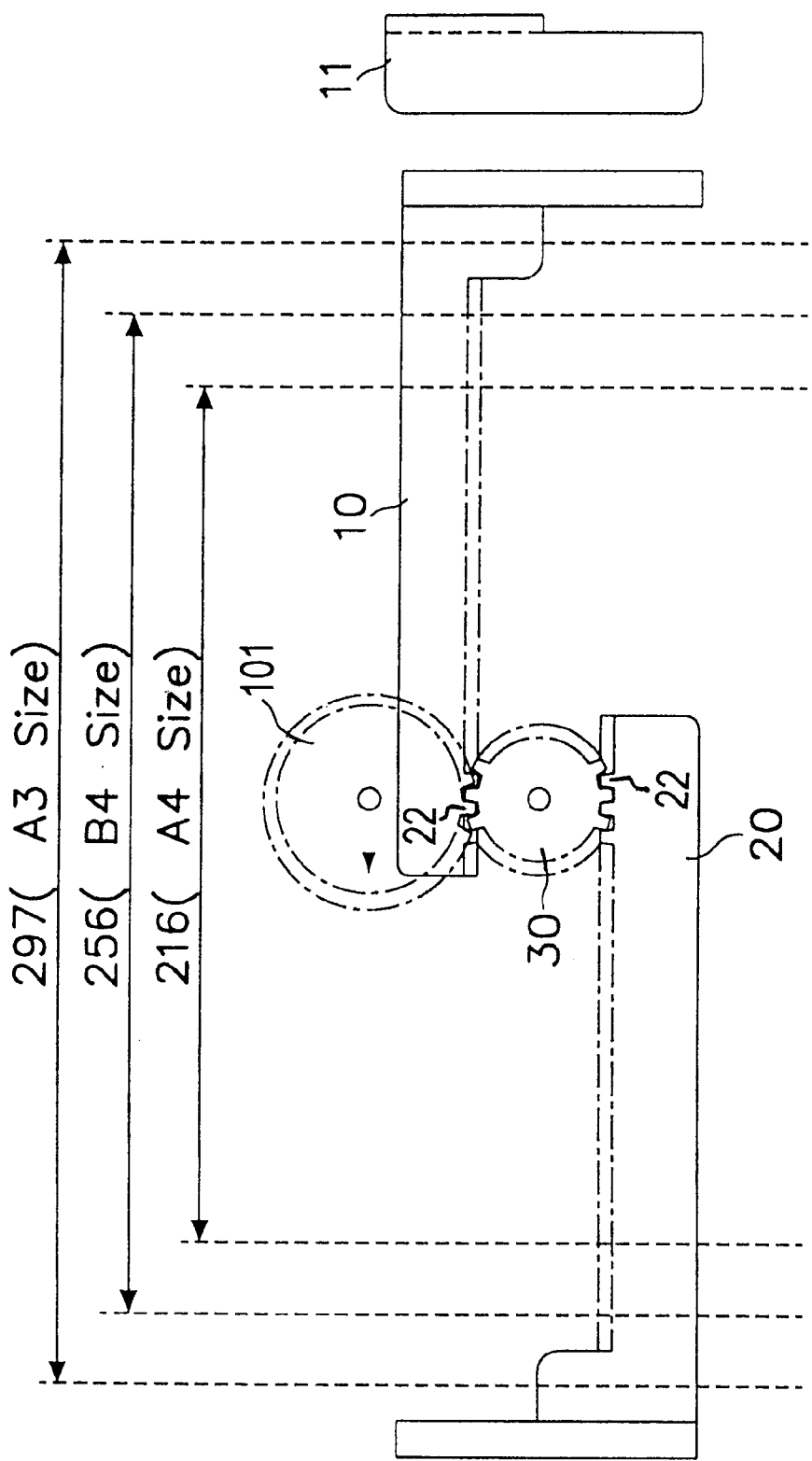
FIG. 9 is a front view of the document size detection device of FIG. 5 sensing a document larger than the A3 size.

The first embodiment of the present invention is shown in a position to accommodate an original document having a width of less than the A4 size in FIG. 6. FIG. 7 shows the document size detection device in a position to accommodate original documents of greater width than the A4 size and of less width than the B4 size. The first embodiment of the present invention is shown in a position to accommodate an original document of greater width than the B4 size and of less width than the A3 size in FIG. 8. FIG. 9 shows the document size detection device in a position to accommodate original documents of greater width than the A3 size.

Figure 10:
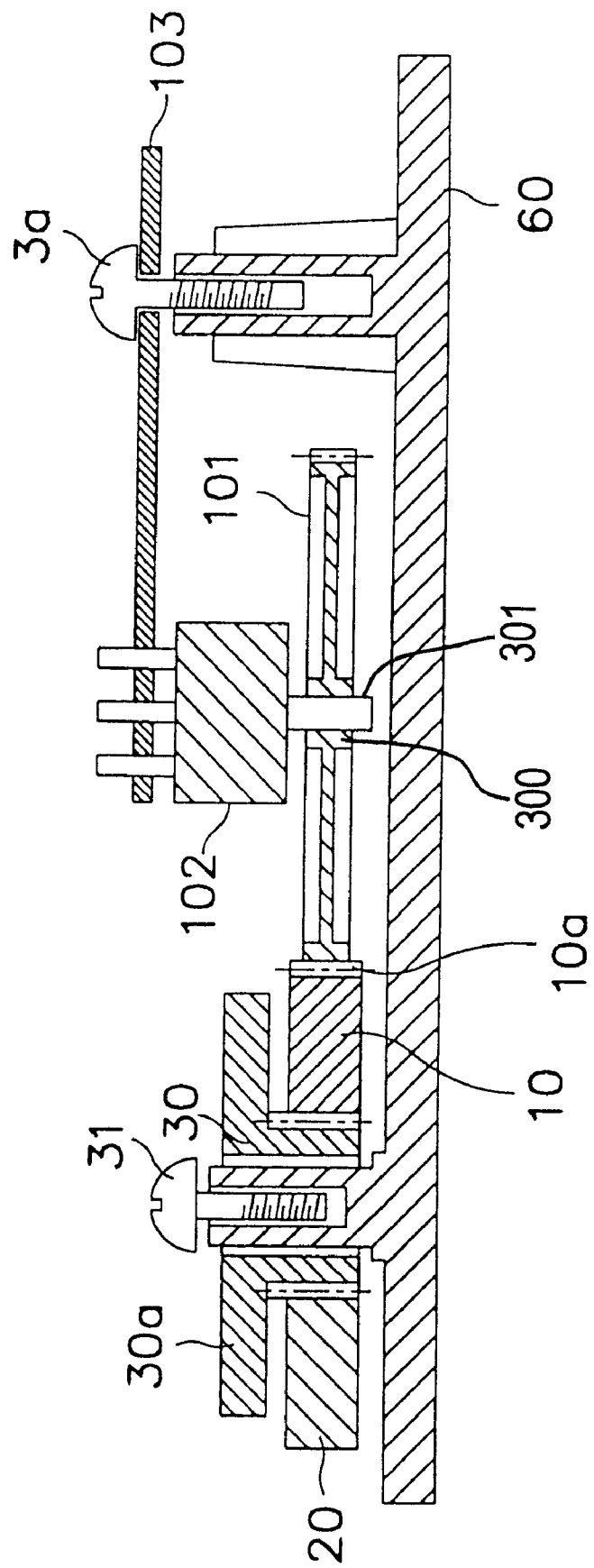
FIG. 10 is a cross-sectional view of second embodiment of a document size detection device as constructed according to the principles of the present invention.
Figure 11:
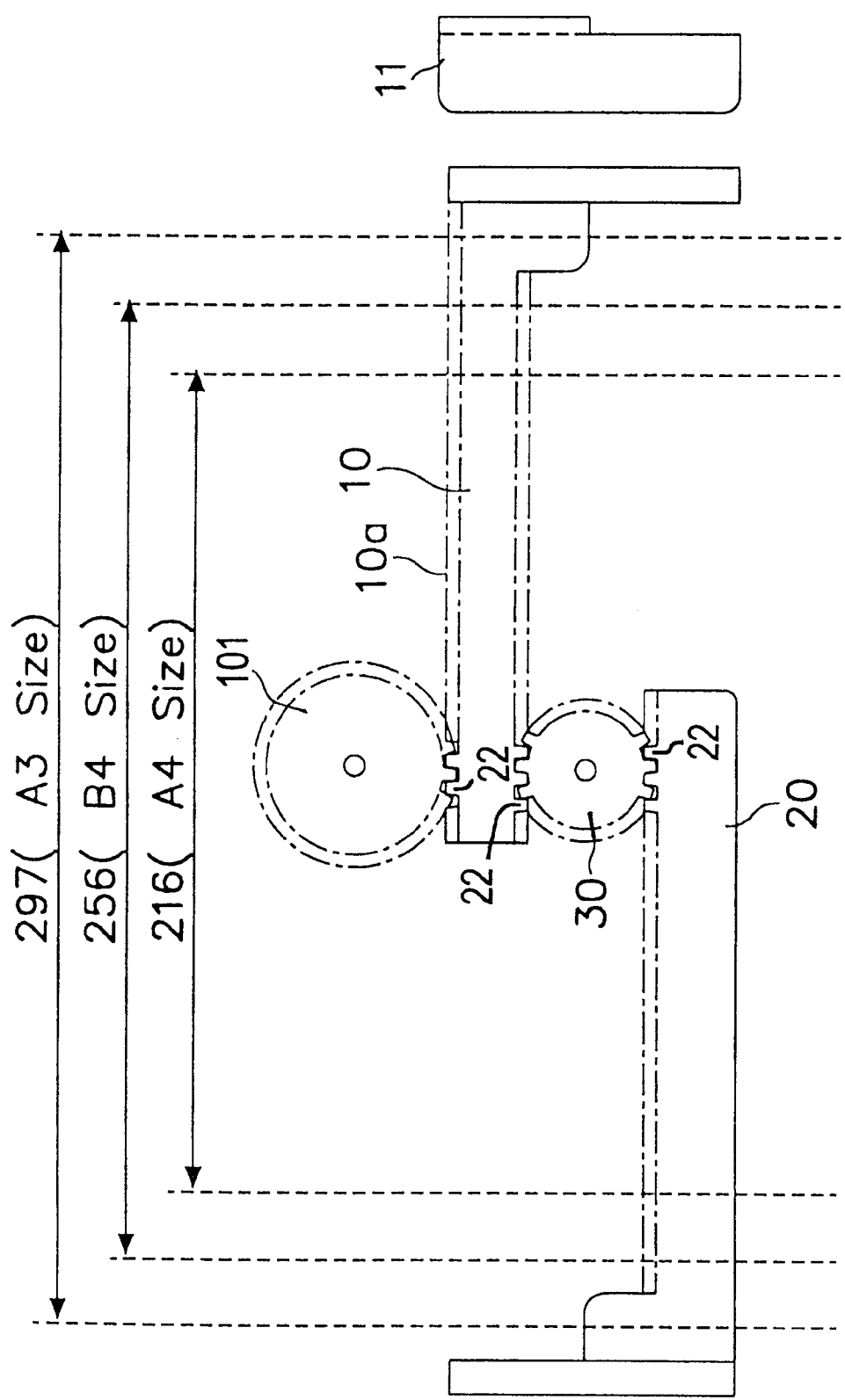
FIG. 11 is a front view of the document size detection device of FIG. 10.

FIGS. 10 and 11 shows a second embodiment of a document size detection device as constructed according to the principles of the present invention. The second embodiment of the document size detection device may be constructed using first document guide 10 that has saw-teeth 22 along both sides of the document guide and second document guide 20 that has saw-teeth 22 along only one side. Sensor driving gear 101 engages first document guide 10 on a side opposite from second document guide 20 and turns knob 301 along with the rotation of sensor driving gear 101. Document size sensor 102 is mounted on sensor board 103 and is coaxially connected with sensor driving gear 101 via knob 301. Sensor 102 may be composed of a variable resistor having knob 301 that varies the resistance generated depending on the position of the document guides.

More specifically, guide gear 30 is interposed between first and second document guides 10 and 20 and is engaged with the document guides to force the document guides to move symmetrically. First document guide 10 has saw-teeth 22 engaged with sensor driving gear 101 causing knob 301 of variable resistor 102 to rotate according to the rotation of sensor driving gear 101. Variable resistor 102 generates different resistances depending on the rotation of sensor driving gear 101. As illustrated in FIG. 10, guide gear 30 has projection 30a formed at a distal end to prevent vertical deviation of first and second document guides 10 and 20. Guide gear 30 is fixed to frame 60 via fastener 31.

In operation, when a user moves first and second document guides 10 and 20 in the document width dimension, guide gear 30 rotates along with the movement of the document guides. Then, sensor driving gear 101, which is engaged with guide gear 30, rotates causing knob 301 of variable resistor, also referred to as document size sensor, 102. Variable resistor 102 provides a different resistance depending on the degree to which knob 301 is rotated. The variable resistor has a first terminal connected to a ground voltage and a second terminal connected to a reference voltage and a third terminal that generates an output voltage.

The output voltage of variable resistor 102 is converted into a digital signal by an analog-to-digital converter (not shown) that then sends the signal to a central processing unit (not shown) to determine the document width from which the original image was generated and the appropriate magnification to use to print the facsimile image onto available paper. By using this type of document width detector it is possible to classify the document into one of 256 different document widths to obtain the best resolution in the printed facsimile message on the receiving side and to minimize the errors caused by a crookedly loaded original document.

As appreciated from the foregoing, a facsimile device employing the document size detection device of the present invention can reduce the original image to an optimal scale by using a greater number of categories to define document width. Thus, it is possible to prevent the original image from bing cut off at both sides of the recording sheet and is also possible to prevent an excessive reduction of the original image. This will reduce the amount of an image that is lacking in clarity due to over reduction and also to the amount of a received image that is illegible. Although two preferred embodiments of the present invention have been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A device for detecting a width of a document used in an image reading and forming apparatus, comprising:

a first paper guide and a second paper guide opposingly positioned and each in contact with one of two opposite sides of said document to guide said document into said image reading and forming apparatus, said first paper guide mounted on a first beam, said second paper guide mounted on a second beam that is oriented parallel to said first beam, said first beam having a first plurality of gear-mating teeth on a side facing said second beam and said second beam having a second plurality of gear-mating teeth on a side facing said first beam;

a first gear interposed between both said first beam and said second beam and forcing said first paper guide and said second paper guide to move symmetrically along a direction of said width of said document, said first gear engaged with both said first plurality of gear-mating teeth on said first beam and said second plurality of gear-mating teeth on said second beam, a second gear driving a document size sensor and engaged with said first gear;

said document size sensor having a rotary knob coaxially coupled to said second gear; and said rotary knob rotating when both said first guide and said second guide are adjusted, said document size sensor outputting a signal depending on a rotational position of said knob corresponding to a distance between said first paper guide and said second paper guide to determine said width of said document.

2. The device of claim 1, further comprised of said first paper guide being perpendicularly mounted on said first beam and said second paper guide being mounted perpendicularly on said second beam.

3. The device of claim 1, further comprised of said document size sensor being a variable resistor.

4. The device of claim 3, further comprised of said first gear having a circumferential lip formed around a middle section to prevent the vertical deviation of both said first beam and said second beam.

5. The device of claim 1, further comprising a sensor board fixed to a frame supporting said device, said sensor board being attached to said document size sensor.

6. The device of claim 5, further comprised of said first gear being rotably fastened to said frame.

7. The device of claim 1, further comprised of said first plurality of gear-mating teeth and said second plurality of gear mating teeth being saw-teeth.

8. The device of claim 1, further comprising an analog to digital converter changing said signal into a digital signal that is received by a central processing unit.

9. The device of claim 1, further comprised of said document size sensor outputting said signal representing at least 256 different categories of document width.

10. A device for detecting a width of a document used in an image reading and forming apparatus, comprising:

a first paper guide and a second paper guide opposingly positioned and each in contact with one of two opposite sides of said document to guide said document into said image reading and forming apparatus, said first paper guide mounted on a first beam, said second paper guide mounted on a second beam that is oriented parallel to said first beam, said first beam having a first plurality of gear-mating teeth on both sides perpendicular to the side supporting said first paper guide, said second beam having a second plurality of gear-mating teeth on a side facing said first beam;

a first gear interposed between both said first beam and said second beam and forcing said first paper guide and said second paper guide to move symmetrically along a direction of said width of said document, said first gear engaged with both said first plurality of gear-mating teeth on said first beam and said second plurality of gear-mating teeth on said second beam, a second gear driving a document size sensor and engaged with said first paper guide;

said document size sensor having a rotary knob coaxially coupled to said second gear; and said rotary knob rotating when both said first guide and said second guide are adjusted, said document size sensor outputting a signal depending on a rotational position of said knob corresponding to a distance between said first paper guide and said second paper guide to determine said width of said document.

11. The device of claim 10, further comprised of said first paper guide being perpendicularly mounted on said first beam and said second paper guide being mounted perpendicularly on said second beam.

12. The device of claim 10, further comprised of said document size sensor being a variable resistor.

13. The device of claim 12, further comprised of said first gear having a circumferential lip formed around a middle section to prevent the vertical deviation of both said first beam and said second beam.

14. The device of claim 10, further comprising a sensor board fixed to a frame supporting said device, said sensor board being attached to said document size sensor.

15. The device of claim 14, further comprised of said first gear being rotably fastened to said frame.

16. The device of claim 10, further comprised of said first plurality of gear-mating teeth and said second plurality of gear mating teeth being saw-teeth.

17. The device of claim 10, further comprising an analog to digital converter changing said signal into a digital signal that is received by a central processing unit.

18. The device of claim 10, further comprised of said document size sensor outputting said signal representing at least 256 different categories of document width.

19. A device for detecting a width of a document used in an image reading and forming apparatus, comprising:

a first paper guide and a second paper guide opposingly positioned and each in contact with one of two opposite sides of said document to guide said document into said image reading and forming apparatus, said first paper guide mounted on a first beam, said second paper guide mounted on a second beam that is oriented parallel to said first beam, said first beam having a first plurality of gear-mating teeth on both sides perpendicular to the side supporting said first paper guide, said second beam having a second plurality of gear-mating teeth on a side facing said first beam;

a first gear interposed between both said first beam and said second beam and forcing said first paper guide and said second paper guide to move symmetrically along a direction of said width of said document, said first gear engaged with both said first plurality of gear-mating teeth on said first beam and said second plurality of gear-mating teeth on said second beam, a second gear driving a variable resistor and engaged with said first paper guide;

said variable resistor being attached to a circuit board and having a rotary knob coaxially coupled to said second gear; and said rotary knob rotating when both said first guide and said second guide are adjusted, said circuit board outputting a signal depending on a rotational position of said knob of said variable resistor corresponding to a distance between said first paper guide and said second paper guide to determine said width of said document.

20. The device of claim 19, further comprised of said document size sensor outputting said signal representing at least 256 different categories of document width.

* * * * *